United States Patent [19]
Dutkiewicz et al.

[11] Patent Number: 5,878,234
[45] Date of Patent: Mar. 2, 1999

[54] LOW POWER SERIAL PROTOCOL TRANSLATOR FOR USE IN MULTI-CIRCUIT BOARD ELECTRONIC SYSTEMS

[75] Inventors: Marek Dutkiewicz, Delta; Henry Li, Vancouver, both of Canada

[73] Assignee: Sierra Wireless, Inc., Canada

[21] Appl. No.: 710,024

[22] Filed: Sep. 10, 1996

[51] Int. Cl.$^6$ ........................................... G06F 13/00
[52] U.S. Cl. ........................ 395/290; 395/285; 395/309
[58] Field of Search ........................... 395/290, 285, 395/280, 306, 309, 200.38, 500, 559

[56] References Cited

U.S. PATENT DOCUMENTS

| | | | |
|---|---|---|---|
| 5,513,334 | 4/1996 | Alexander | 711/103 |
| 5,592,633 | 1/1997 | Casis et al. | 395/309 |
| 5,696,994 | 12/1997 | Pang | 395/884 |

FOREIGN PATENT DOCUMENTS 0 051 332   5/1982   European Pat. Off. .

OTHER PUBLICATIONS

Patent Abstracts Of Japan, vol. 013, No. 064 (P–827), 14 Feb. 1989 & JP 63 250759 A (Nippon Motorola KK), 18 Oct. 1988, see abstract; figures 1,2.

*Primary Examiner*—Ayaz R. Sheikh
*Assistant Examiner*—Xuong Chung-Trans
*Attorney, Agent, or Firm*—Burns, Doane, Swecker & Mathis LLP

[57] ABSTRACT

A low power reduced size serial device protocol translator including a slave controller and detection circuit for detecting start and stop conditions on serial data (SDA) and serial clock (SCL) lines in a serial communication system is described. The start and stop condition detector includes two flip-flops; one for providing a signal that indicates when a start condition has occurred on the SDA and SCL lines and another for indicating when a stop condition has occurred. Each of the flip-flops have their data inputs coupled to a high logic level and their enable input coupled to the serial clock line. The first flip-flop for indicating the start condition has its clock input coupled to the inverse of the serial data signal and the second flip-flop for indicating the stop condition has its clock input directly coupled to the serial data signal. As a result, the first and second flip-flops are only enabled and clocked when either a start or stop condition is occurring, resulting in an extremely low power slave controller detection system. The translator of the present invention translates serial signals between slave and master devices having different protocol types. The translator utilizes sub-protocol signals including length information corresponding to the number of data bits being transmitted to the slave device. The translator uses the length information to gate the serial data from the master device to the slave device. The translator allows for reduction of physical interconnections in a master/slave system in which a master devices resides on a first printed circuit board (PCB) and communicates with slave devices on a second PCB having more than one type of serial communication protocol. In this case, the translator resides on the same PCB as the slave devices thus requiring that only the serial buses corresponding to the master device protocol type be physically coupled across the two PCB's interconnection interface.

31 Claims, 8 Drawing Sheets

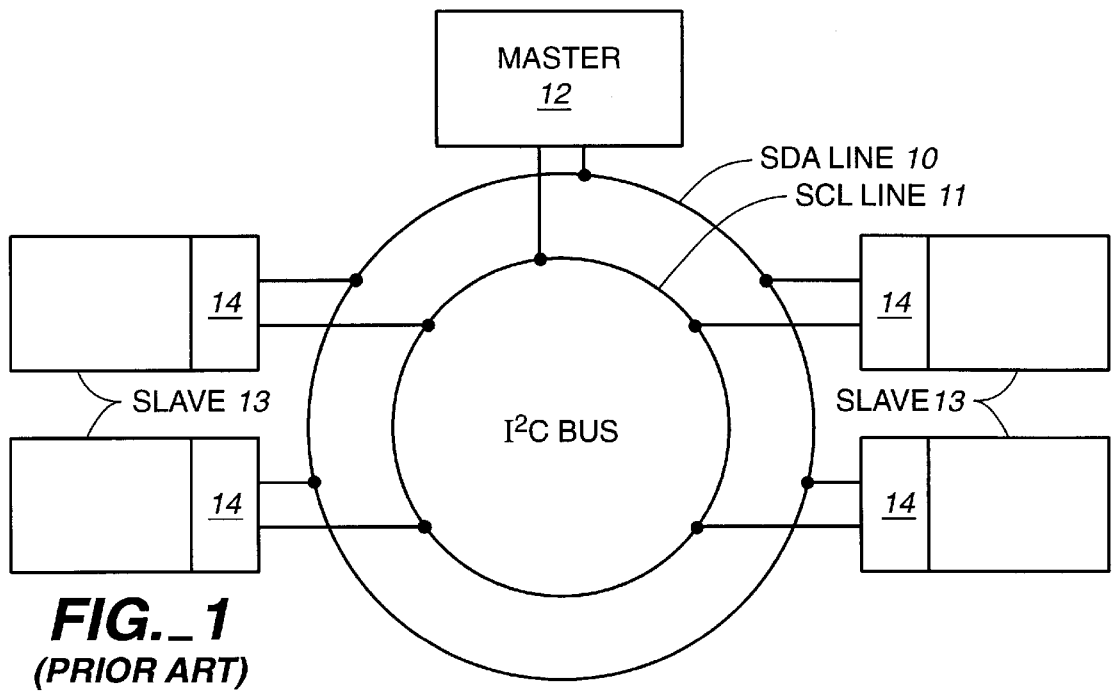
FIG._1
(PRIOR ART)
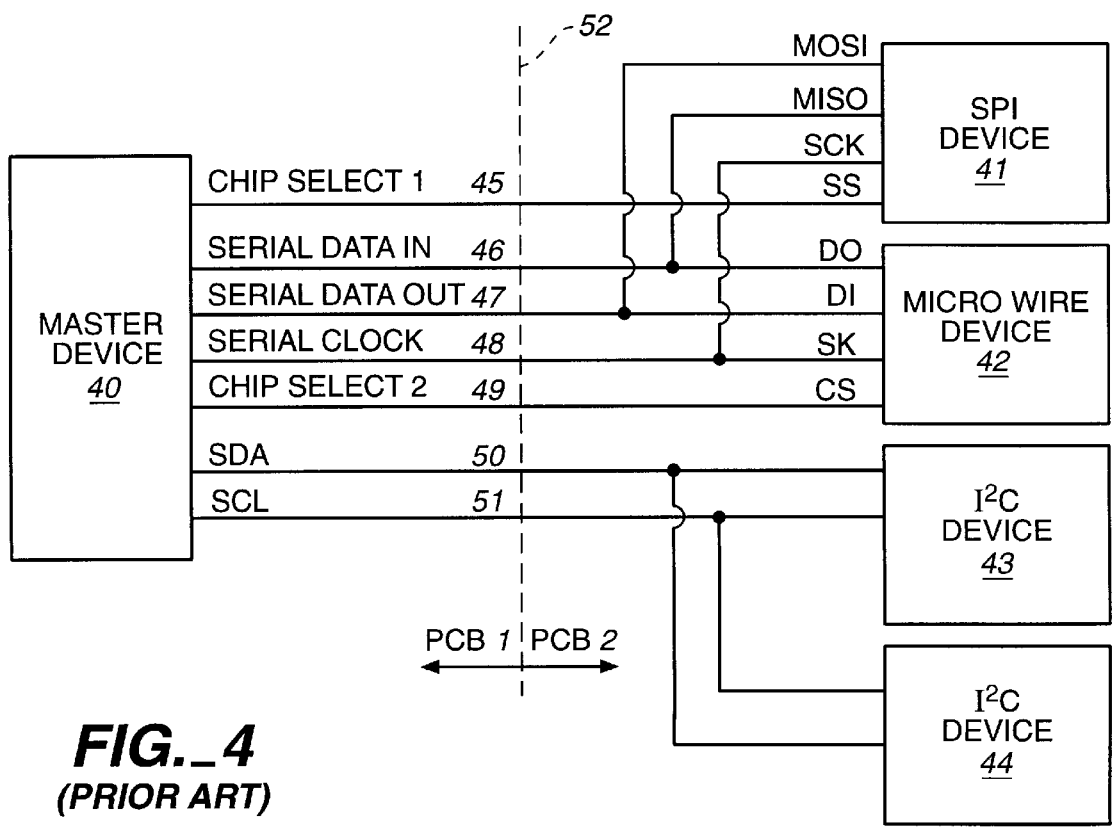
FIG._4
(PRIOR ART)

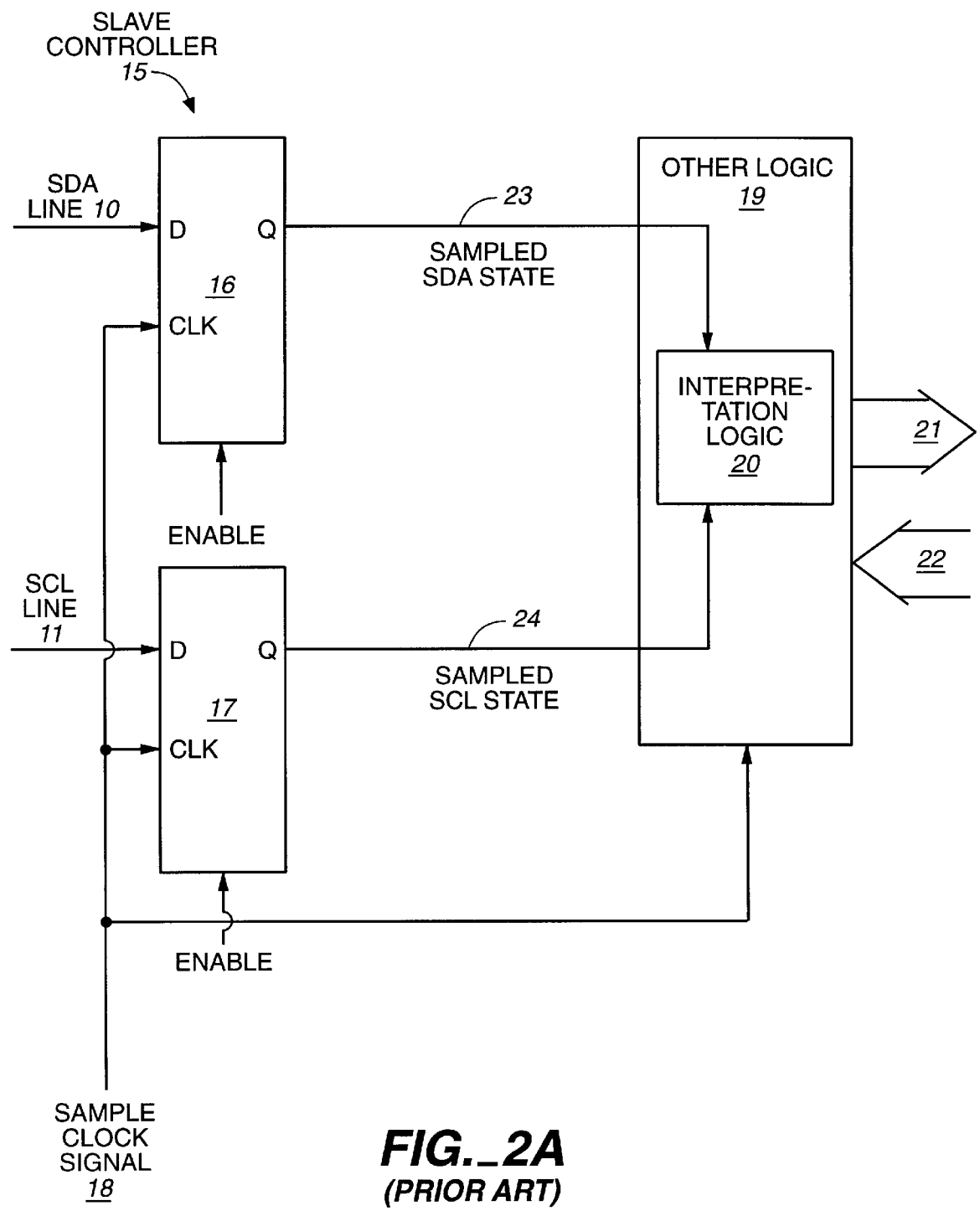
FIG._2A
(PRIOR ART)

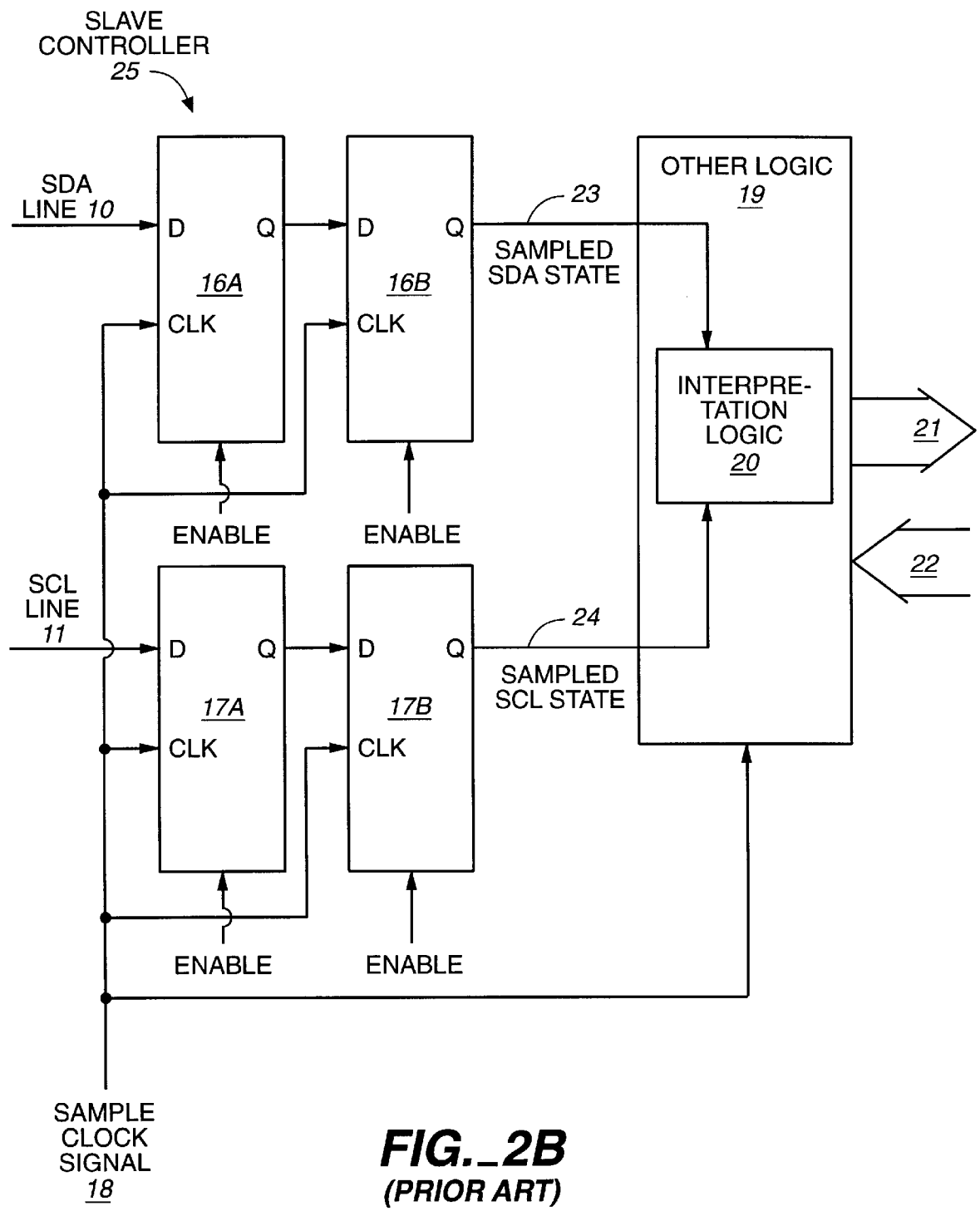
FIG._2B
(PRIOR ART)

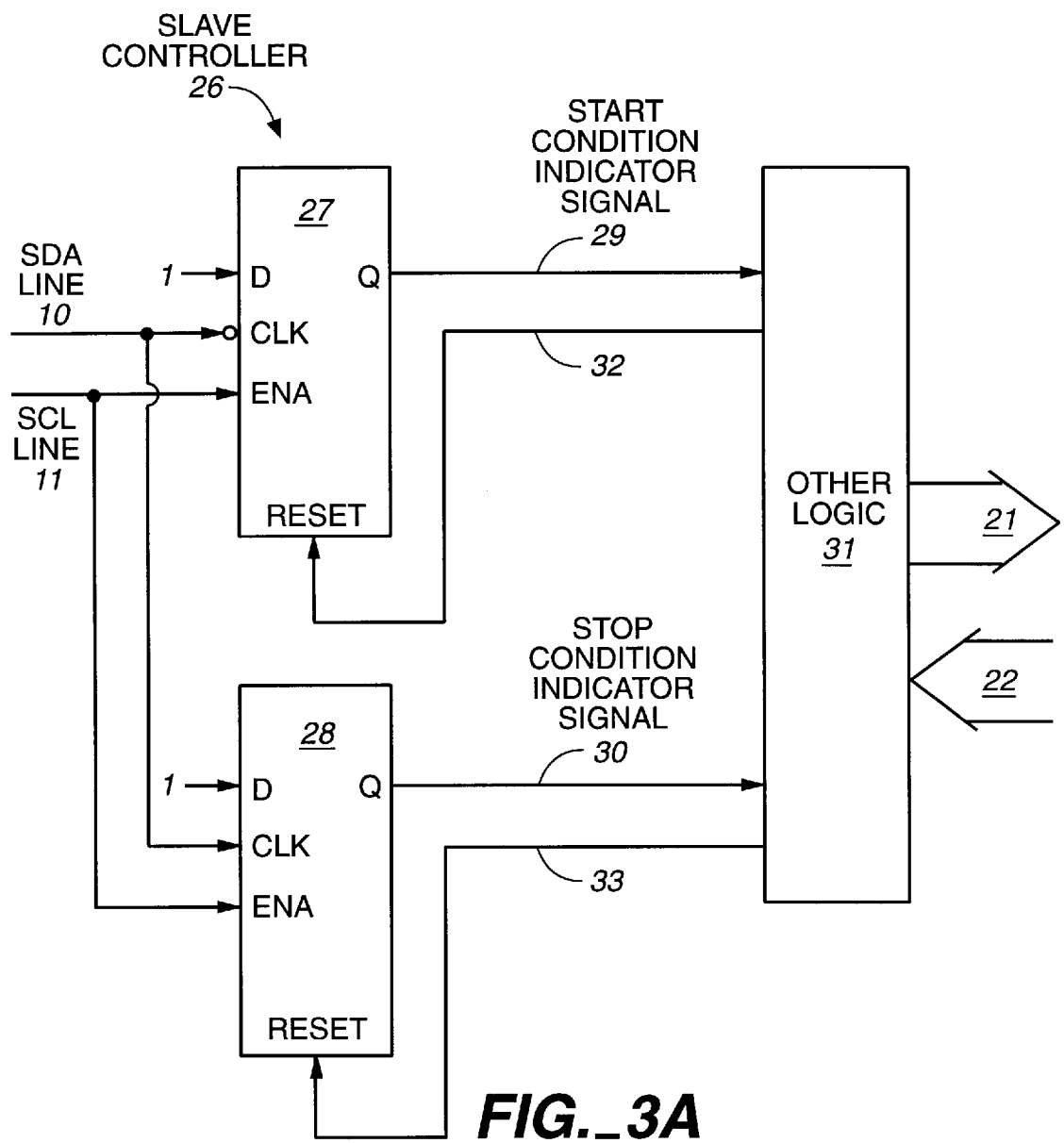
FIG._3A

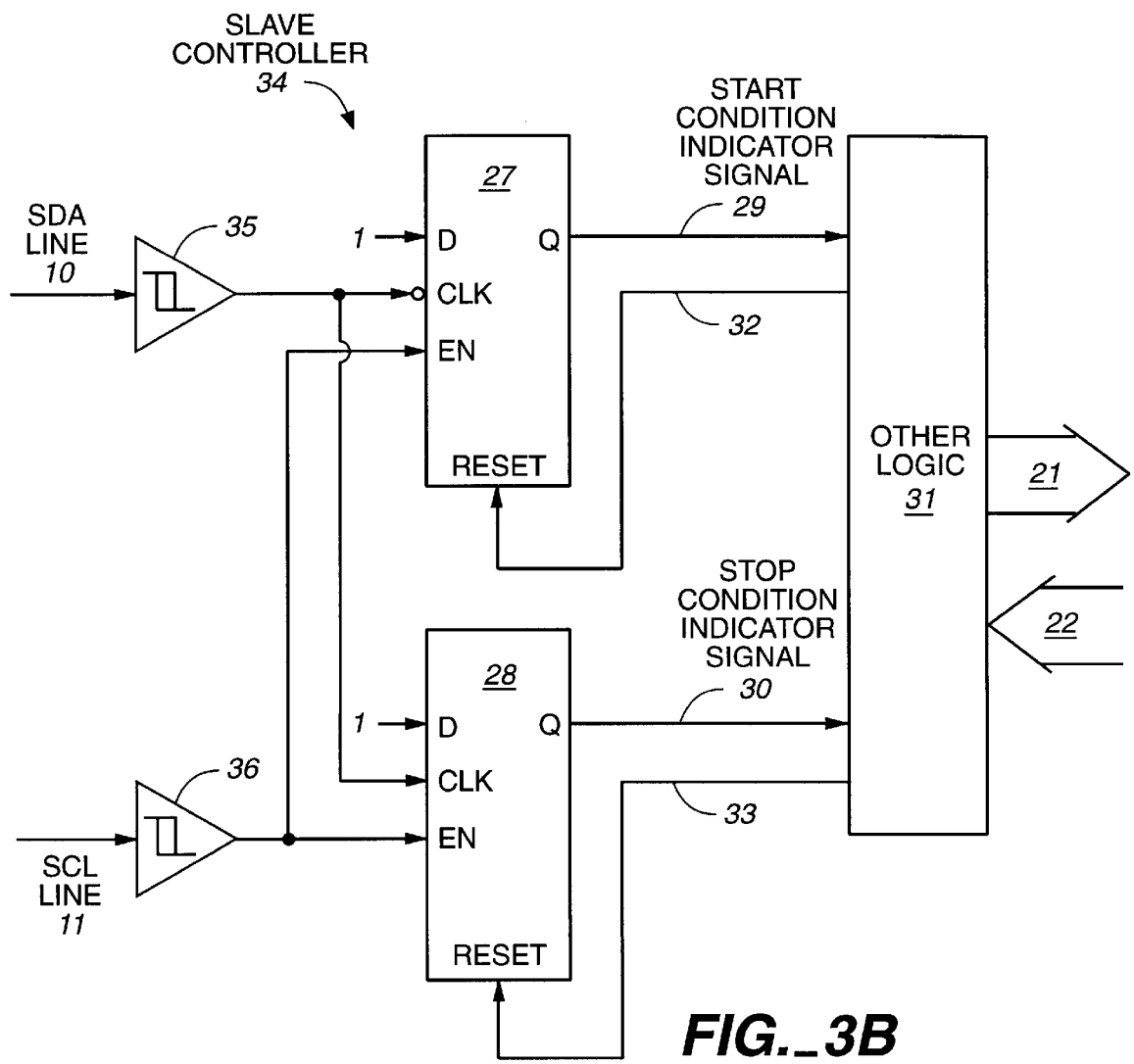
FIG._3B

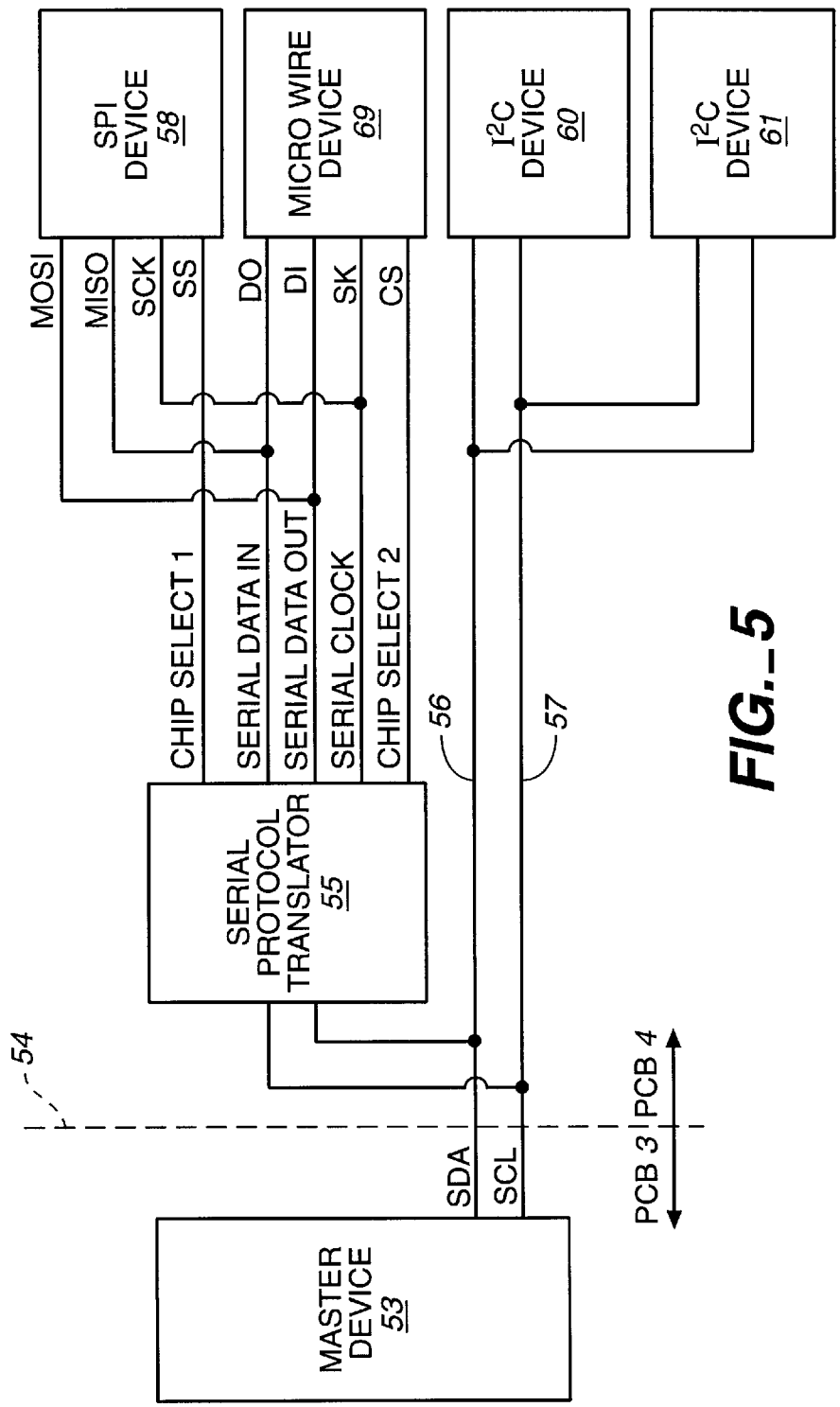
FIG._5

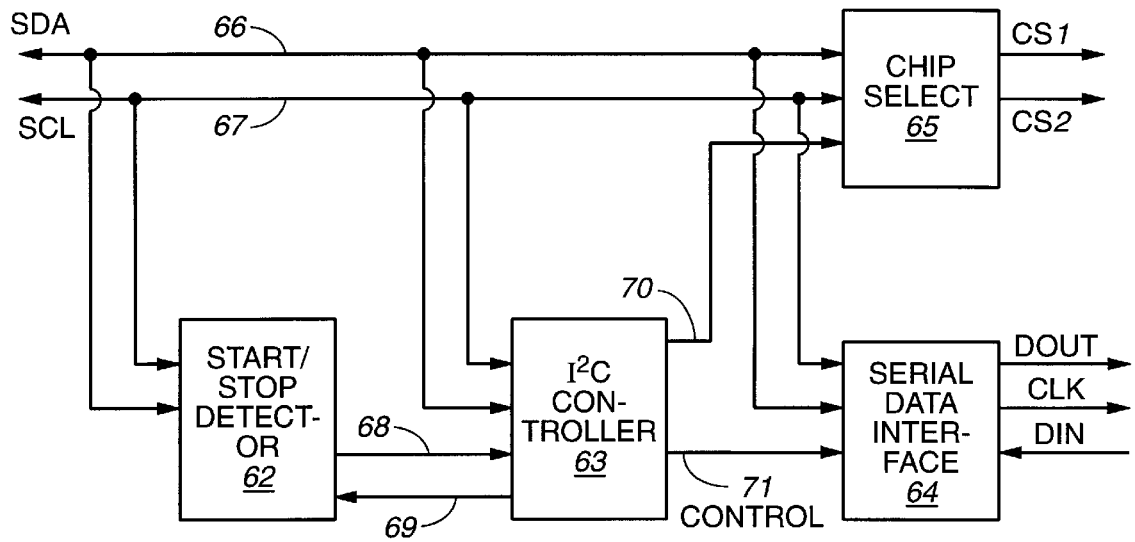
FIG._6
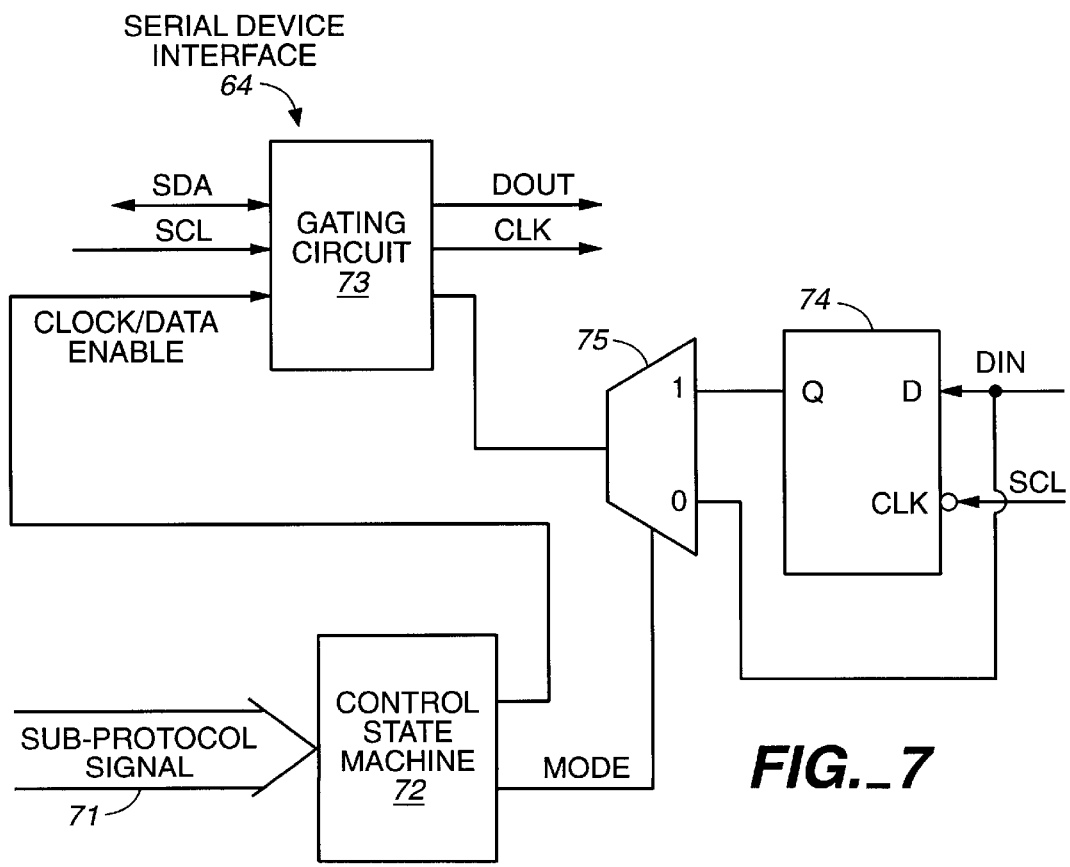
FIG._7

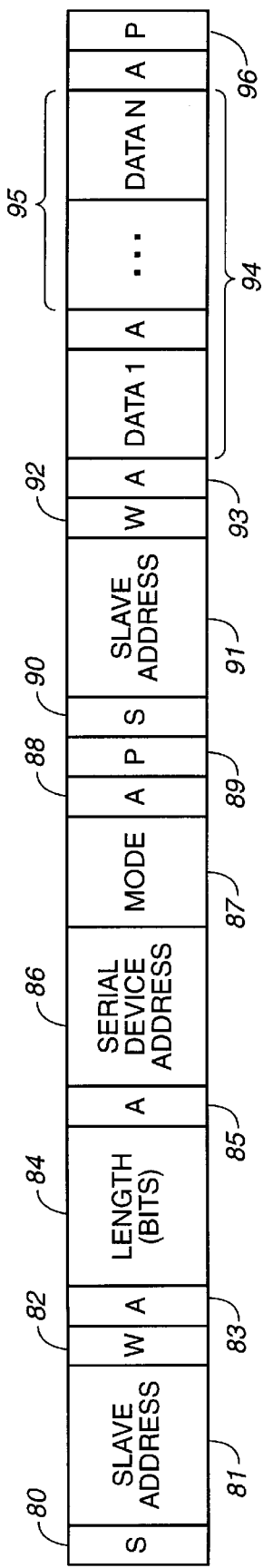
FIG._8A
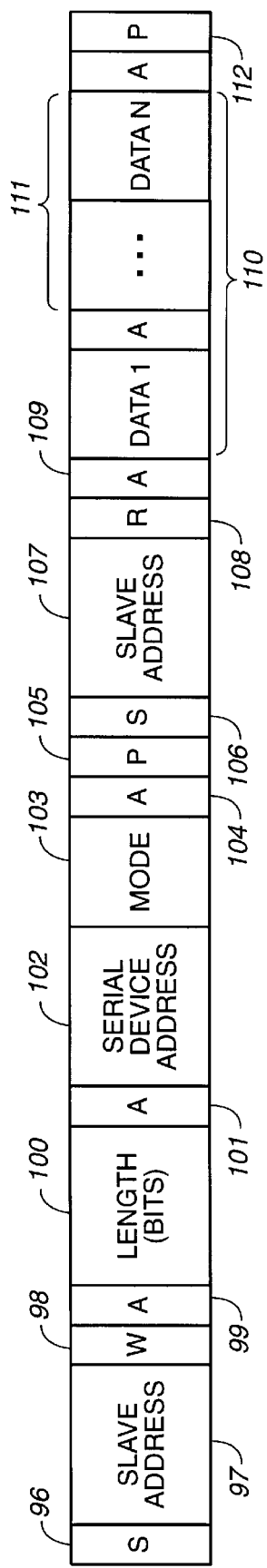
FIG._8B

LOW POWER SERIAL PROTOCOL TRANSLATOR FOR USE IN MULTI-CIRCUIT BOARD ELECTRONIC SYSTEMS

FIELD OF THE INVENTION

The present invention relates to the field of serial data communication between devices, and particularly to serial data translation in a master/slave type serial data communication system.

BACKGROUND OF THE INVENTION

In a system having multiple electronic devices, such as an electronic system including many devices assembled on a printed circuit board, it is necessary to select the manner in which communication is to be performed between the devices. In general, there are two techniques of communication: serial or parallel. In one type of serial communication system all devices are coupled to a serial data (SDA) line and a serial clock (SCL) line. Each of the SDA and SCL are single bit lines, hence data is transferred one bit at a time (i.e. serially) on the SDA at a rate determined by the clock being transmitted on the SCL line.

In one such prior art serial communication system (developed by Philips Semiconductor), the SDA and SCL lines are referred to as the $I^2C$ bus. The $I^2C$ bus has an associated set of rules, or protocol, that characterize how communication and arbitration between devices is performed on the $I^2C$ bus. The protocol of the $I^2C$ bus eliminates or reduces the possibility of confusion of data transfer origin/destination, of information blockage, or data loss. For instance, if two devices initiate data transfers, the $I^2C$ protocol determines which device is able to perform the data transfer depending on the particular SDA and SCL line conditions that have occurred or are occurring. Furthermore, in this type of system, only one device at a time (referred to as the master) can control the transfer of information on the SDA and SCL lines to any other device (referred to as a slave) coupled to the SDA and SCL lines. The master device provides the clock signal on the SCL line and data is transferred on the SDA line from the master device to the slave device, or vice versa.

One manner in which the $I^2C$ bus protocol is implemented is by defining the conditions on the SDA and SCL lines that indicate the start and stop of a data transfer operation. Detection and identification of the start and stop conditions alerts the devices coupled to the $I^2C$ bus as to whether they can or cannot initiate a data transfer on the SDA. The start and stop conditions must be unique conditions occurring only when the particular designated event occurs (i.e. start or stop of transmission).

It is typical in prior art serial data transfer systems to employ a slave controller which generally resides within each slave device. The slave controller communicates with the master device when performing data transfers on the SDA line. For instance slave controllers often identify the start and stop of data transmissions, which slave device is being accessed or transmitted to, acknowledgment signals, and other conditions relating to the transfer of data.

The slave controller requires detection circuitry to identify the start and stop conditions of data transfers on the SDA and SCL lines so it can perform its many functions. Currently, the detection of the start and stop conditions within a slave controller (and in other slave devices) is performed by a first stage that samples the SDA and SCL lines and an interpretation stage that interprets the sampled states provided by the first stage. The first stage samples the lines at a high frequency clock rate (typically greater than 1.0 MHz) which is greater than the clock rate of the SCL line which typically transitions at a rate of up to 100 kHz. The sample circuitry generally includes two flip-flop devices each one having its data input coupled to one of the SDA and SCL lines and its clock input coupled to the high frequency sampling clock signal. The sampling clock signal can be generated internal to the slave controller, on a separate clock chip, or may be provided by some other external source. The output of each flip-flop is the logic state sampled on the SDA and SCL lines. The sample circuit provides the sampled states (or conditions) of the SDA and SCL lines to the interpretation stage which interprets these states and determines whether a start or stop condition has occurred.

The start and stop conditions on an $I^2C$ bus are defined as follows: 1) a start condition occurs when the SDA line is transitioning high-to-low while the SCL line is high, 2) a stop condition occurs when the SDA line is transitioning low-to-high while the clock is in a high state. Hence, when the prior art sample flip-flop coupled to the SDA line outputs a low state and the sample flip-flop coupled to the SCL line outputs a high state during the same sample clock phase and these output states are coupled to the interpretation stage, a start condition is detected by the interpretation logic. Furthermore, when the flip-flop sampling the SDA line outputs a high state and the flip-flop sampling the SCL line outputs a high state during the same sample clock phase and these output states are coupled to the interpretation stage, a stop condition is detected. Typically, the interpretation logic is clocked by the sampling clock signal so as to be synchronized with the sampling circuitry.

There are several drawbacks to the prior art slave controller detection system. First, it requires the additional sample clock signal which is generated either external or internal to the slave controller. This additional high frequency clock presents several disadvantages within the prior art slave controller such as added noise, additional integrated circuit or printed circuit board space, and added power dissipation to generate the sample clock signal. Secondly, the sampling flip-flops are constantly sampling the SDA and SCL lines and hence, are constantly dissipating power. Third, this type of detection circuitry requires two stages: the flip-flop stage to sample the SDA and SCL lines and an interpretation stage to interpret the states of the sampled SDA and SCL lines. Hence, additional circuit space is consumed by the interpretation logic. Furthermore, since the interpretation logic stage is typically synchronized with the sample clock, additional circuit space is consumed by the interconnection of the sample clock signal to the interpretation logic. Finally, it is often common practice to implement each individual flip-flop in the sampling stage of the prior art slave controller detection system with multiple series connected flip-flops. Specifically, instead of using two flip-flops to sample the SDA and SCL lines, four flip-flops are employed. The four flip-flop sample stage is implemented in the following manner: the first flip-flop has its input coupled to the SDA line and its output coupled to the input of the second flip-flop. The output of the second flip-flop is the sampled state of the SDA signal. Similarly, the third flip-flop has its input coupled to the SCL line and its output coupled to the input of the fourth flip-flop. The output of the fourth flip-flop is the sampled state of the SCL signal. Each of the first through fourth flip-flops are clocked by the sample clock signal. This multiple flip-flop implementation takes into account slow transitioning signals on the SDA and SCL lines that may result in the false interpretation of start or stop conditions. However, this implementation consumes even more space and power within the slave controller than the two flip-flop sample stage implementation.

Another aspect of a master/slave serial communication system is that the master device often interfaces with multiple slave devices having different serial communication protocols. For instance, one type of serial communication device uses a serial communication protocol referred to as SPI (developed by Motorola). The SPI protocol uses four bi-directional pins: MISO (Master In/Slave Out), MOSI (Master Out/Slave In), SCK (Serial Clock), SS (Slave Select). Furthermore, data is clocked out of the SPI slave device with the falling edge and clocked into the slave device with the rising edge of the SCK. SPI serial communication defines a hardware interface (i.e. the four bi-directional pins) and partially, a software protocol. Another type of serial communication interface is referred to as MicroWIRE (developed by National Semiconductor). The MicroWIRE interface differs from SPI in that it does not specifically define any protocol. Instead, it only defines a basic set of signal lines to interconnect two or more devices. A MicroWIRE interface has four signal lines: CS (Chip Select), SK (Serial clock), DI (Data In), DO (Data Out). These are analogous to SS, SCK, MISO, and MOSI of the SPI interface. The main difference between the physical portion of the MicroWIRE and SPI interfaces is that a MicroWIRE slave device clocks both input and output data on the rising edge only and the falling edge has no effect on the devices. This means a MicroWIRE device must be read differently than a SPI compatible device due to the different clocking requirements.

As a result of the differing protocol and interconnection characteristics of the various serial communication slave devices, an I$^2$C master device is often designed with multiple ports for interconnecting between each of these varying protocol type slave devices. Specifically, an I$^2$C master device is often designed to include SDA and SCL ports for interfacing with other I$^2$C slave devices in addition to separate serial input, output, clock, and chip select ports for interfacing with the other protocol type slave devices such as SPI or MicroWIRE devices (i.e. a total of six interconnection ports). Furthermore, it is often common to implement a communication system in which the master and slave devices reside on separate printed circuit boards (PCBs) thus requiring multiple physical interconnections between the boards. In other words, in the above case, a total of six physical interconnects would be required in order to couple the master device on a first PCB with the slave devices on a second PCB to accommodate the different types of serial communication slave device protocols. These physical interconnections between the PCBs represent a potentially large amount of undesirable EMI in a communication system.

What is needed is a more space and power efficient implementation of a SDA and SCL state detector in a slave controller and thus an overall reduced power and smaller slave controller. In addition, what is needed is a manner in which to implement a multiple board serial communication system having slave devices using more than one serial communication protocol which is other than the master device protocol.

SUMMARY OF THE INVENTION

The present invention is a low power serial translator design including a low power detection circuit for detecting conditions on serial communication signal lines. The detection circuit is particularly applicable to detecting start and stop conditions on an I$^2$C bus and providing these conditions to an I$^2$C slave controller in a serial communication system. The protocol translator is particularly applicable to low power I$^2$C to SPI and MicroWIRE protocol translation and may also include both the detection circuit of the present invention for detecting start and stop conditions for an I$^2$C slave controller. Hence, the translator of the present invention is a low-power interfacing device that provides overall detection, control, and protocol translation in a master/slave serial communication system.

The low-power detection circuit of the present invention includes a single stage detector which is implemented with two flip-flops. The first flip-flop is for outputting a signal that indicates when a start condition has occurred and the second flip-flop is for outputting a signal that indicates when a stop condition has occurred. In one embodiment of the present invention, when a start condition has occurred the first flip-flop will output a high logic state, otherwise the output of the first flip-flop is low. Similarly, when a stop condition has occurred the second flip-flop will output a high logic state, otherwise it outputs a low logic state. Each of the flip-flops are reset shortly after the occurrence of the start and stop conditions.

In one embodiment for detecting the start and stop conditions of an I$^2$C bus, each of first and second D-type flip-flops have a data port, a clock port, an enable port, and a reset port. The first flip-flop has its data port coupled to a voltage corresponding to a high digital logic state, its clock input coupled to the inverse of the SDA signal, and its enable port coupled to the SCL signal. Since the start condition for an I$^2$C bus occurs when the SDA line transitions high-to-low while the SCL line is high, the first flip-flop is enabled by the SCL signal and clocked by the inverse of the SDA signal so as to cause the first flip-flop to output the high logic state coupled to its data port when a start condition occurs. The second flip-flop has its data port coupled to a voltage corresponding to a high digital logic state, its clock input coupled to the SDA signal, and its enable port coupled to the SCL signal. Since the stop condition for an I$^2$C bus occurs when the SDA line transitions low-to-high while the SCL line is high, the second flip-flop is enabled by the SCL signal and clocked by the SDA signal so as to cause the second flip-flop to output the high logic state coupled to its data port when a stop condition occurs. Since the first and second flip-flops are only clocked and enabled when a start and stop condition is occurring, the detection circuitry is only consuming power when start and stop conditions occur. Since the first and second flip-flops provide logic signals that indicate the start and stop conditions instead of sampled SDA and SCL line signals, subsequent interpretation logic is obviated. Furthermore, since the implementation of the detection circuitry does not require an additional sampling clock signal, the slave controller of the present invention does not need to be synchronized with an external sample clock and instead uses the clock signal on the SCL line, thereby obviating the additional prior art sample clock.

In another embodiment of the present invention, a Schmitt triggered buffer is coupled in series with the input SDA and SCL signal lines so as to eliminate the false detection of start and stop signals due to slow transitioning SDA and SCL signals.

The serial protocol translator of the present invention is designed to interface between a first protocol type device and other protocol types of devices. In one embodiment, protocol translation is performed between an I$^2$C protocol master device residing on a first printed circuit board (PCB) and SPI, MicroWIRE, and I$^2$C slave devices residing on a second PCB.

One implementation of the present invention is a system having an I²C master device residing on the first PCB and the serial communication protocol translator of the present invention and a plurality of slave devices of various protocol types residing on the second PCB. In this implementation, the number of interconnections between the first and second PCBs is reduced to a two wire I²C interconnection (i.e. SDA and SCL). The two wire interconnection between the first and second PCBs couples the SDA and SCL signals from the master device to the serial communication protocol translator of the present invention which in turn translates the received I²C signals into serial signals compatible with the plurality of slave devices residing on the second PCB. The translator of the present invention generates and utilizes internal sub-protocol signals. The sub-protocol signals are generated by extracting information from the SDA and SCL signals. Furthermore, the sub-protocol signals define the number of data bits being transmitted to the SPI or MicroWIRE device and other state and control information required to perform the translation.

In one embodiment of the translator of the present invention for interfacing between an I²C master device and a SPI, MicroWIRE, or another I²C slave device, the translator includes an I²C slave controller, a serial data interface, a chip selector, and the start/stop detector of the present invention. The start/stop detector functions to identify the start and stop conditions on the SDA line and indicates these conditions to the I²C slave controller. The I²C slave controller extracts address, data, and timing signals from the I²C data signal transmitted from the master device and generates sub-protocol control signals for driving the serial data interface of the present invention. The sub-protocol signals include length information indicating the number of data bits to be transferred to the SPI or MicroWIRE slave device in addition to an operation code and the data information being transmitted. Other information included in the sub-protocol signal is mode information which indicates whether communication is being performed with an SPI or MicroWIRE device. The serial data interface comprises a control state machine for receiving and interpreting the sub-protocol signals transmitted from the I²C controller and generating a gate enable signal. The serial data interface also includes a gating circuit controlled by the state machine's gate enable signal for gating the I²C serial data and clock signal onto the data and clock buses of the SPI or MicroWIRE slave devices.

In the case of a write operation (i.e. a transmission from the master device to an SPI or MicroWIRE device) the control state machine in response to the sub-protocol signals transmitted from the I²C slave controller provides the gate enable signal having the appropriate timing for controlling the gate circuit so as to gate the I²C clock and data signals onto the SPI or MicroWIRE bus. In the case of a read operation involving an SPI device (i.e. transmission from an SPI device to a master device) data from the SPI device is gated directly onto the I²C data line (i.e. SDA) since both the SPI and I²C device clock data similarly. In the case of a read operation involving a MicroWIRE device, data must be reclocked on the next falling edge to satisfy set-up times. Hence, one embodiment of the translator includes a digital multiplexer which either selects and couples the serial device data directly to the SDA bus (in the case of an SPI mode read) or selects and couples a reclocked version of the serial data (in the case of a MicroWIRE read operation) onto the SDA bus.

In still another embodiment, the translator of the present invention optionally includes a chip select/slave select signal generator responsive to control signals from the I²C slave controller which indicate the address of the device receiving the communication. The chip select device provides the select signal required by the SPI or MicroWIRE protocol device during a read or write operation. Alternatively, this select signal can be provided by the master device.

Finally, the translator of the present invention does not require a high speed oscillator and is instead clocked by the SCL bus signal and thus is implemented with minimal power consumption.

BRIEF DESCRIPTION OF THE DRAWINGS

FIG. 1 illustrates a prior art I²C bus serial communication system.

FIG. 2A illustrates a prior art slave controller device including a first embodiment of a prior art start and stop detection system.

FIG. 2B illustrates a prior art slave controller device including a second embodiment of a prior art start and stop detection system.

FIG. 3A illustrates the slave controller of the present invention including a first embodiment of the start and stop condition detection system of the present invention.

FIG. 3B illustrates the slave controller of the present invention including a second embodiment of the start and stop condition detection system of the present invention.

FIG. 4 illustrates a prior art master/slave serial communication system having physical interconnections for each serial protocol type across the PCB interface between a master device PCB and a slave device PCB.

FIG. 5 illustrates the serial communication system of the present invention having physical interconnections for one serial protocol type across the PCB interface between a master device PCB and a slave device PCB.

FIG. 6 illustrates a logic diagram of one embodiment of the serial communication translator of the present invention.

FIG. 7 illustrates a logic diagram of one embodiment of the serial data interface of the present invention employed in the translator of the present invention.

FIGS. 8A and 8B illustrates the serial device interface I²C sub-protocol format of the present invention.

DETAILED DESCRIPTION

A low power translator in a serial communication system including circuitry for detecting conditions on serial communication lines is described. In the following description, numerous specific details are set forth, such as particular conditions to be detected on the serial communication lines, corresponding logic levels defining these conditions, and protocol types in order to provide a thorough understanding of the present invention. It will be obvious, however, to one skilled in the art that these specific details need not be employed to practice the present invention. In other instances, well-known serial communication systems and theory have not been described in detail in order to avoid unnecessarily obscuring the present invention.

FIG. 1 illustrates one type of serial communication system (referred to as the I²C communication system) including an I²C bus. As shown, the I²C bus includes SDA line 10 for transmitting data between the devices in the serial communication system and an SCL line 11 for transmitting a clock signal. The system shown in FIG. 1 has a single master device 12 and several slave devices 13. The master device is defined as the device which initiates/terminates data transfers with other slave devices on SDA line 10 and generates the clock signals on SCL line 11 to clock the transfers. Although the system shown in FIG. 1 includes a single master, it should be understood that more than one of the devices coupled to the SDA and SCL lines can function as a master device. However, only a single device can be a master at any given time. Hence the master/slave status in this type of system is not a permanent condition.

In general, each device coupled to the SDA and SCL lines has a unique identification addresses which allows the master device to identify which device the data transfer is to be performed with. Master device 12 can initiate data transfers in which data is transmitted to the master from a slave or to a slave from the master.

Each slave device generally includes a slave controller 14 that communicates with the master device and performs several functions during data transfers. For instance, the slave controller often detects the start and stop conditions of a data transfer, identifies the slave address for the data transfer provided by the master, identifies whether a write or read operation is being performed, and identifies when acknowledgment and data signals occur on the SDA line. It should be understood that the type of system in which slave controller 14 is used (i.e. a communication system) determines what particular functions the slave device will be designed to perform.

FIG. 2A illustrates a prior art slave controller 15. In order for the slave controller to perform its functions during data transfers, it is necessary for the slave controller to detect the defined start and stop conditions on the SDA and SCL lines. As shown in FIG. 2A, the prior art slave controller includes flip-flop 16 and flip-flop 17. Flip-flops 16 and 17 are typically D-type flip-flops. Flip-flop 16 has its data port coupled to the SDA line 10, its clock port coupled to a high frequency sampling clock signal 18 and its output coupled to other logic 19 which includes interpretation logic 20. The other logic 19 performs the other functions of the slave controller 15 as described above. Flip-flop 17 has its data port coupled to the SCL line 11, its clock port coupled to sampling clock signal 18 and its output coupled to interpretation logic 20. Each of flip-flops 16 and 17 sample the signals on the SCL and SDA lines and provide the sampled states to interpretation logic 20 at the sampling clock signal rate. The sampling clock is also coupled to the other logic 19 portion of the slave controller 15 in order to synchronize this logic with the sample rate of flip-flops 16 and 17. The slave controller also includes input and output ports 21 and 22 which is coupled to other circuitry within the slave device.

Detection of conditions on the SDA and SCL lines is performed by prior art slave controller 15 by constantly sampling lines 10 and 11 with flip-flops 16 and 17 at a rate set by clock signal 18. These flip-flops provide a sample state to the interpretation logic which constantly monitors the state of output lines 23 and 24. The interpretation logic 20 signals to the other logic 19 when a start or stop condition occurs on the sampled SDA and SCL lines 23 and 24.

FIG. 2B illustrates another prior art slave controller including four flip-flips 16A, 16B, 17A, and 17B. As can be seen, the output of 16A couples into the input of 16B which then provides the sampled SDA state to the interpretation logic 20 on line 23. Similarly, the output of 17A is coupled into the input of 17B which then provides the sampled SCL state to interpretation logic 20 on line 24. It should also be noted that all four of the flip-flops are clocked with sample clock 18 and are constantly enabled and providing sampled signals to interpretation logic 20. It should be well understood in the field of circuit design that this prior art implementation (employing four flip-flops) for detecting the I²C start and stop conditions operates in the same manner as the implementation shown in FIG. 2A but additionally functions to eliminate false detection of start and stop conditions due to slow transitioning SDA and SCL signals. This prior art implementation also holds the disadvantage of dissipating twice the power as the prior art implementation shown in FIG. 2A and consuming more system space.

FIG. 3A illustrates the slave controller 26 of the present invention including a first embodiment of a start and stop detection system having flip-flop 27 and 28. In one embodiment flip-flops 27 and 28 are D-type flip-flops. Each of flip-flops 27 and 28 have a data (D) input port, a clock (CLK) input port, an enable (ENA) input port and an output port (Q). Flip-flop 27 provides a logic signal indicating either a start condition (i.e. high logic state) or no start condition (i.e. low logic state). Flip-flop 28 provides a logic signal indicating either a stop condition (i.e. high logic state) or no stop condition (i.e. low logic state). Furthermore, each of the data inputs of flip-flops 27 and 28 are coupled to a high logic state, and their enable inputs are coupled to the SCL line 11 signal. The CLK input of flip-flop 27 is coupled to the inverse of the SDA signal and the CLK input of flip-flop 28 is coupled directly to the SDA signal.

The detection system shown in FIG. 3A functions in the following manner. When the SDA line 10 transitions high-to-low while the SCL line signal is high (i.e. a I²C start condition), flip-flop 27 is enabled and clocked and thus passes the high ("1") logic level on its D input port to output line 29. The signal on line 29 is a start condition indicator. When it is high, a start condition has occurred and when it is low no start condition has occurred.

When the SDA line 10 transitions low-to-high while the SCL line signal is high (i.e. a I²C stop condition), flip-flop 28 is enabled and clocked and thus passes the high ("1") logic level on its D input port to output line 30. The signal on line 30 is a stop condition indicator. When it is high, a stop condition has occurred and when it is low no stop condition has occurred.

The other logic 31 of slave controller 26 senses the start and stop condition indicators on signal lines 29 and 30 and performs the functions that it was designed to perform. Furthermore, other logic 31 provides a reset signal on each of lines 32 and 33 shortly after a start or stop condition has occurred so as to reset each of flip-flops 27 and 28. When flip-flops 27 and 28 are reset, their outputs Q are set back to a low ("0") state.

The slave controller 26 of the present invention holds many advantages over the prior art slave controllers shown in FIGS. 2A and 2B. First, the present invention's slave controller is extremely power efficient since flip-flops 27 and 28 are only enabled and clocked when a start and stop condition is occurring. In contrast, the prior art implementations shown in FIGS. 2A and 2B use constantly enabled flip-flops that are constantly clocked by an external sampling clock signal.

Furthermore, the present invention's slave controller does not require an additional sampling clock signal. Instead, the clock input of flip-flop 27 is coupled to the inverse of the SDA line signal 10 and the clock input of flip-flop 28 is coupled to the SDA line signal. As a result of not having to generate a sample clock signal, the detection system of the present invention is not exposed to the additional noise that often is generated by the sample clock. Furthermore, the present invention dissipates less power since it is not generating the sample clock signal, and uses less circuit space since a clock generator is obviated and because no additional interconnections between the other logic and the flip-flops are required. Hence, the present invention not only offers a superior start and stop condition detection system, but also provides an overall reduced power and size slave controller.

The start and stop conditions described above are unique to the I²C bus serial communication system. It should be understood that the concept of the present invention can also be adapted to detect other conditions on data lines. For instance, other inverters may be added to the embodiment shown in FIG. 3A in the case in which each of the start and stop conditions occur when the SCL line is low.

FIG. 3B illustrates an embodiment of the slave controller of the present invention which ensures that false start and stop conditions are not detected when the clock signal on the SCL line is a slow transitioning signal. For instance, if the SCL clock signal begins to transition at the same time as the SDA line but the SCL signal does not reach a voltage level corresponding to a high logic state at the same rate as the SDA line, a start or stop condition may not be detected. The slave controller 34 shown in FIG. 3B includes first and second Schmitt triggered buffers 35 and 36 coupled between the input of the clock inputs of flip-flops 27 and 28 and the input signal lines SDA and SCL. The Schmitt triggers function such that when a signal on its input reaches a certain level its output automatically transitions fully high/low, without waiting for the input signal to finish its full transition. As a result, differences between transition times of the SDA and SCL lines become negligible. It should be understood that flip-flops 27 and 28 shown in FIG. 3B function in the same manner as described in FIG. 3A.

It is also the intention of the present invention that the start and stop detection circuit of the present invention shown in FIGS. 3A and 3B can be implemented with functional logic other than a slave controller.

For instance, the detector of the present invention may be employed to detect start and stop conditions in the translator of the present invention which includes an I²C slave controller. The translator of the present invention functions to translate serial communication signals of a first protocol type into serial communication signals of a second protocol type. The translator is particularly applicable in a system in which a master device of a first protocol type residing on a first printed circuit board (PCB) is communicating with a plurality of slave devices having protocols other than the master device protocol and residing on a second PCB. FIG. 4 illustrates a communication system of this type in which the master device 40 is an I²C protocol type device and slave devices 41–44 are SPI, MicroWIRE, or I²C device types. Also shown are interconnection lines 45–51 which couple signals from master device 40 to the slave devices.

Slave device 41 is designed to use SPI protocol (developed by Motorola). Specifically, an SPI type device uses four bi-directional pins: MISO (Master In/Slave Out), MOSI (Master Out/Slave In), SCK (Serial Clock), SS (Slave Select). Since device 41 is employed only as a slave device in the system shown in FIG. 4, the MISO pin corresponds to a serial data output port and the MOSI pin corresponds to a serial data input port. Hence, the slave device 41 MISO pin is coupled to serial data in (signal line 46) of master device 40, the MOSI pin is coupled to serial data out pin (signal line 47), the SCK pin is coupled to serial clock pin (signal line 48), and the SS pin is coupled to chip select I (signal line 45). Data is clocked out of the SPI slave device with the falling edge and clocked into the slave device with the rising edge of the SCK. SPI serial communication defines a hardware interface (i.e. the four bi-directional pins) and partially, a software protocol characterizing the SPI serial signals.

Slave device 42 is designed to use MicroWIRE protocol (developed by National Semiconductor). A MicroWIRE device differs from an SPI device in that it does not specifically define any protocol. Instead, it only defines a basic set of signal lines to interconnect two or more devices. A MicroWIRE interface has four signal lines: CS (Chip Select), SK (Serial clock), DI (Data In), DO (Data Out). These are analogous to the SS, SCK, MISO, and MOSI ports of the SPI interface. Hence, the DO pin of slave device 42 is coupled to the serial data in pin (signal line 46) of master device 40, the DI pin is coupled to the serial data out pin (signal line 47), the SK pin is coupled to the serial clock pin (signal line 48), and the CS pin is coupled to the chip select 2 pin (signal line 49). The main difference between the physical portion of the MicroWIRE and SPI devices is that a MicroWIRE slave device clocks both input and output data on the rising edge only and the falling edge has no effect on the device. This means a MicroWIRE device must be read differently than a SPI compatible device due to the different clocking requirements.

Slave devices 43 and 44 are I²C devices and thus can be coupled directly to the SDA and SCL ports (signal lines 50 and 51) of master device 40. The implementation shown in FIG. 4 also shows an interface line 52 which delineates the boundary between first and second PCBs (PCB1 and PCB2). Hence, in this system, master device 40 generates and interconnects more than one set of serial data signals across interface line 52. Specifically, master device 40 interconnects across interface line 52: a chip select 1 signal line, a serial data in signal line, a serial data out signal line, a serial clock signal line, a chip select 2 signal line, a SDA signal line, and a SCL signal line. It is evident that in this system a total of seven inter-connect lines are required to coupled the master device to the slave devices across interface 52. These inter-connect lines represent a large amount of potential electromagnetic interference (EMI) which can reduce the overall performance of the communication system.

FIG. 5 illustrates one implementation of the communication system of the present invention including the serial protocol translator 55 of the present invention for reducing interconnects in a master/slave communication system. Master device 53 (residing on PCB 3) generates only I²C compatible signals which are interconnected across PCB interface 54 to serial protocol translator 55 of the present invention. Hence, the number of interconnects crossing PCB interface 54 is reduced from seven interconnect lines (i.e. lines 45–51, FIG. 4) to two interconnect lines (i.e. 56 and 57, FIG. 5). Translator 55 receives the SDA and SCL signals and generates the appropriate serial signals which are compatible with each of slave devices 58–61. Slave devices 60 and 61 are coupled directly to SDA and SCL lines 56 and 57 since they employ the same protocol as the master device 53.

FIG. 6 illustrates one embodiment of a logic diagram of the serial protocol translator 55 of the present invention including a start/stop detector 62, an I²C slave controller 63, a serial data interface 64 and a chip selector 65 each being coupled and responsive to the SDA and SCL signals transmitted from the master device. It should be understood that the blocks of the translator of the present invention in FIG. 6 are shown to illustrate the logical functionality of the translator. However, it should be understood that all or some of these logical functions may be integrated into a single device. For instance, although the start/stop detector 62 and the I²C slave controller 63 are shown separately in FIG. 6, they may be integrated together into a single circuit device such as shown above in FIGS. 3A and 3B.

The following describes the elements of the translator of the present invention shown in FIG. 6. Detector 62 functions as described above to detect, interpret, and indicate to the I²C slave controller 63 (on signal line 68) the start and stop conditions occurring on the I²C SDA and SCL buses (signal lines 66 and 67). Slave controller 63 provides a reset signal (on signal line 69) to reset start/stop detector 62 after each occurrence of a start or stop condition. Slave controller 63 also extracts information from the I²C bus in order to provide control to other functional blocks in the translator. In one embodiment, the slave controller includes addressing logic for storing the address of the slave device appearing in the serial data being transmitted on the I²C bus and providing it to chip selector 65 (on signal line 70). Slave controller 63 also generates a set of control signals in a sub-protocol format (on signal line 71) to the serial data interface 64. These control signals indicate the various conditions and states of each data transfer and also includes length information of the number of data bits being transferred to the SPI or MicroWIRE device. The serial data interface 64 uses the length information and sub-protocol signals to provide the appropriate timing for gating the I²C SDA and SCL signals onto the SPI or MicroWIRE DOUT and CLK buses. Data is coupled from the SPI and MicroWIRE slave devices on the DIN port, through the serial data interface 64, and to the SDA and SCL line. In the case in which a MicroWIRE device is coupling data to the DIN port, additional reclocking and multiplexing is required.

FIG. 7 illustrates one embodiment of the serial data interface 64 including a state machine 72 for interpreting the sub-protocol signals 71 provided by the I²C slave controller and for providing a gate enable signal to gating circuit 73. In response to the state machine gate enable signal, gating circuit 73 gates the I²C SDA and SCL signals onto the CLK and DOUT signal lines depending on the type of protocol of the slave device that the data is being transmitted to. The gated CLK and DOUT signals are transmitted to the slave device which is currently enabled by the chip select signal provided by chip select 65 (FIG. 6).

In the case of a read operation in which data is being transmitted from a slave device to the master device, the serial device interface needs to account for the difference in the SPI and MicroWIRE read operation timing characteristics. Since a SPI protocol slave device clocks data out on the falling edge of the clock and the I²C protocol master device expects to read data on the next rising edge of the clock, data and clock signals from SPI slave devices are compatible to the SDA and SCL signal lines. However, a MicroWIRE slave device clocks data out on the rising edge. As a result, data signals from MicroWIRE devices need to be reclocked to occur on the next falling edge. Hence, serial device interface 64 further includes a delay gate 74 implemented as a D-flip flop and multiplexer 75. Data from slave device input bus, DIN, is coupled to a first input of multiplexer 75 through delay gate 74 and is also coupled directly to a second input of multiplexer 75. A mode signal from control state machine 72 indicates whether data should be reclocked (i.e. taken from the "1" port) or should be taken directly from the DIN bus (i.e. taken from the "0" port), depending on whether a read is being performed with an SPI or MicroWIRE device. Hence, in the case of an SPI or I²C slave device read operation, serial device data is passed directly to gating circuit 73 and in the case of a non-compatible read operation, serial data is reclocked before being passed to gating circuit 73. The selection of which type of signal (direct or reclocked) is determined by the mode signal provided by the control state machine. This mode information may be embedded within the sub-protocol signal 71.

FIGS. 8A illustrates one embodiment of a write operation data string in the sub-protocol format of the present invention, and 8B illustrates one embodiment of a read operation data string in sub-protocol format.

As shown the write operation data string (FIG. 8A) includes a first start indicator bit (80) indicating a start condition, followed by the slave device address (8 1), a write bit (82) indicating a write operation, and an acknowledge bit (83). For each acknowledge clock sent by the master the slave device corresponding to the slave address 81 transmits an acknowledge bit back to the master to indicate that the string prior to the acknowledge bit has been received. The next series of bits in the write operation string (FIG. 8A) are the length bits (84) indicating the length of the data being transmitted, an acknowledge bit (85), the address (86) of the serial data interface 64 (FIG. 6), the mode indicator (87) indicating whether data needs to be reclocked to account for serial device differences, an acknowledge bit (88), and finally a stop condition bit (89). The sequence of bits 80–89 basically establishes all of the parameters of the data transfer operation. The data transfer operation occurs in the next sequence of bits (FIG. 8A) beginning with start bit (90), followed by the slave address (91), a write bit (92), an acknowledge bit (93), data bits (Data 1–DataN) (94) with intermediate acknowledge bits (95), and finally, a stop condition bit (96).

A read operation serial bit signal (FIG. 8B) is formatted similarly. The start bit (96) indicates the start of the read operation, which is followed by the address (97) of the slave device that the read operation is occurring with. This is followed by a write operation indicator (98) which is necessary since the master device first writes to the slave device to indicate that a read operation is occurring before the read operation occurs. This is followed by an acknowledge bit (99). Length bits (100) indicate the number of bits being read, which is followed by an acknowledge bit (101), the address (102) of the serial data interface, the mode of operation bits (103), an acknowledge bit (104), and a stop condition bit (105). In the next series of bits the data transfer from the slave device to the master occurs. It begins with start condition bit (106), the slave address (107), a read operation indicator (108), and acknowledge bit (109). The serial data, Data1–DataN (110), is read from the serial device followed by intermediate acknowledge bits (111) and finally stop condition bit (112).

The serial data strings shown in FIGS. 8A and 8B are examples of write and read operation data strings in a serial communication system which include the mode and length information as is described according to the present invention. However, it is to be understood that other formats may be used depending on the specific serial communication system design.

Although the elements of the present invention have been described in conjunction with certain embodiments, it is appreciated that the invention may be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

We claim:

1. A controller in a system including a serial data bus and a serial clock bus, said serial clock bus transmitting a serial clock signal which determines the rate at which data is transmitted on said serial data bus, said controller comprising:

a first means for detecting a first data transfer condition, said first means generating a first signal indicating said first data transfer condition in response to a first logic state transition type on said serial data bus and to a first logic state on said serial clock bus, said first means being disabled when said serial clock bus is in a second logic state;

a second means for detecting a second data transfer condition, said second means generating a second signal indicating said second data transfer condition in response to the inversion of a second logic state transition type on said serial data bus and to said first logic state on said serial clock bus, said second means being disabled when said serial clock bus is in said second logic state;

a means for providing control in response to said first and second signals, said control means resetting said first and second means to indicate no first and second data transfer conditions.

2. The controller as described in claim 1 wherein said first and second means are first and second flip-flops, respectively, each having a data input coupled to an indicator signal, having an enable input coupled to said serial clock bus, and having a reset input coupled to said control means, said first flip-flop also having a clock input coupled to said serial data bus through an inverting means and said second flip-flop having a clock input coupled to said serial data bus.

3. The controller as described in claim 2 further including a first Schmitt triggered buffer coupled between said clock input of said first flip-flop and said serial data bus, and a second Schmitt triggered buffer coupled between said serial data bus and said inverting means.

4. The controller as described in claim 3 wherein said first data transfer condition is a condition defining the beginning of a data transfer on said serial data bus, and said second data transfer condition is a condition defining the end of said data transfer on said serial data bus.

5. The controller as described in claim 4 wherein said first transition type is a high-to-low transition, said second transition type is a low-to-high transition, and said logic level state is a high logic level state.

6. The controller as described in claim 5 wherein said serial data and clock buses comprise an I²C bus, said first data condition is a start condition, said second data condition is a stop condition, and said controller is a slave controller in a serial communication system.

7. A detector in a system including a serial data bus and a serial clock bus for detecting data transfer conditions on said serial data bus, said serial clock bus transmitting a serial clock signal which determines the rate at which data is transmitted on said serial data bus, said detector comprising:

a first means for generating a first signal indicating a first data transfer condition in response to a first logic state transition type on said serial data bus and to a first logic state on said clock bus, said first means being disabled when said serial clock bus is in a second logic state;

a second means for generating a second signal indicating said second data transfer condition in response to a second logic state transition type on said serial data bus and to said first logic level state on said clock bus, said second means being disabled when said serial clock bus is in a second logic state.

8. The detector as described in claim 7 wherein said first and second means are first and second flip-flops, respectively, each having a data input coupled to an indicator signal, having a n enable input coupled to said serial clock bus, and having a reset input coupled to a reset signal, said first flip-flop also having a clock input coupled to said serial data bus through an inverting means and said second flip-flop having a clock input coupled to said serial data bus, said reset signal resetting said first and second means to indicate no first and second data transfer conditions.

9. The detector as described in claim 8 further including a first Schmitt triggered buffer coupled between said clock input of said first flip-flop and said serial data bus, and a second Schmitt triggered buffer coupled between said serial data bus and said inverting means.

10. The detector as described in claim 9 wherein said first data transfer condition is a condition defining the beginning of a data transfer on said serial data bus, and said second data transfer condition is a condition defining the end of said data transfer on said serial data bus.

11. The detector as described in claim 10 wherein said first transition type is a high-to-low transition, said second transition type is a low-to-high transition, and said logic level state is a high logic level state.

12. The detector as described in claim 11 wherein said serial data and clock buses comprise an I²C bus in a serial communication system including a plurality of devices, said first data condition is a start condition, said second data condition is a stop condition, and said detector is implemented within at least one of said plurality of devices in said serial communication system.

13. In a master/slave serial communication system including a master device residing on a first printed circuit board (PCB) said master device having an associated master device protocol and master device serial data buses and slave devices residing on a second PCB each device having an associated slave protocol and slave device serial data buses, an apparatus residing on said second PCB for translating the protocol of serial data being transmitted between said master device and said set of slave devices comprising:

a means for detecting start and stop transmission conditions of serial data being transmitted from said master device on said master device serial data buses and generating start and stop transmission condition signals;

a first control means for generating control signals which include information indicating transmission states and conditions of said serial data being transmitted between said master device and said set of slave devices, said first control means being responsive to said start and stop transmission condition signals and to said serial data being transmitted from said master device on said master device serial data buses;

a means for generating a chip select signal for coupling to a selected slave device in response to said first control means control signals;

a second control means for gating said serial data being transmitted from said master device to said selected slave device in response to said control signals and for reclocking serial data being transmitted from a given slave device to said master device depending on said given slave device's associated slave device protocol.

14. The apparatus as described in claim 13 wherein said control signals include in formation indicating the number of data bits in said serial data being transmitted between said master device and said set of slave devices.

15. The apparatus as described in claim 14 wherein said serial data being transmitted from said master device includes a clock signal and wherein said apparatus is clocked with said clock signal.

16. The apparatus as described in claim 15 wherein said first control means control signals are serial data for matted into a sub-protocol other than said associated master device protocol.

17. The apparatus as described in claim 16 wherein said associated master device protocol is the I²C protocol and wherein one of said associated save device protocol is SPI protocol and another of said associated slave device protocol is MicroWIRE protocol.

18. The apparatus as described in claim 17 wherein said second control means includes a means for generating a gate enable signal in response to said first control means control signals and said second control means also includes a means for gating said serial data being transmitted from said master device onto said selected slave device's associated serial data buses in response to said gate enable signal.

19. The apparatus as described in claim 18 wherein said second control means further includes a means for selecting between said reclocked serial data transmitted from said given slave device and serial data that is directly transmitted from one of said slave devices.

20. A master/slave serial data communication system comprising:
  a master device residing on a first printed circuit board having an associated master device protocol and master device serial data buses;
  a set of slave devices residing on a second printed circuit board each slave device having an associated slave device protocol and a set of slave device serial data buses;
  a serial data translator residing on said second printed circuit board being coupled to said master device serial data buses and each of said set of slave device serial data buses, said serial data translator functioning to translate between said master device protocol and said slave device protocol when transmitting serial data between said master device and said set of slave devices.

21. The system as described in claim 20 wherein serial data being transmitted from said master device includes a clock signal and wherein said serial data translator is clocked with said clock signal.

22. The system as described in claim 21 wherein said serial data translator internally utilizes serial data control signals that are formatted into a sub-protocol other than said associated master device protocol and said serial data control signals include information indicating transmission states and conditions and the number of data bits in serial data being transmitted between said master device and said set of slave devices.

23. The system as described in claim 22 wherein said associated master device protocol is the I²C protocol and wherein one of said associated slave device protocol is SPI protocol and another of said associated slave device protocol is MicroWIRE protocol.

24. The system as described in claim 23 wherein said serial data translator includes a means for generating a gate enable signal in response to said sub-protocol formatted serial data control signals and said serial data translator also includes a means for gating said serial data being transmitted from said master device onto a selected slave device's associated serial data buses in response to said gate enable signal.

25. The system as described in claim 24 wherein said serial data translator further includes a means for reclocking serial data being transmitted from a given slave device to said master device depending on said given slave device's associated slave device protocol and a means for selecting between said reclocked serial data transmitted from said given slave device and serial data that is directly transmitted from one of said slave devices.

26. In a master/slave serial data communication system including a master device residing on a first printed circuit board having an associated master device protocol and master device serial data buses, said system comprising:
  a set of slave devices residing on a second printed circuit board each slave device having an associated slave device protocol and a set of serial device data buses;
  a serial data translator residing on said second printed circuit board being coupled to said master device serial data buses and each of said set of slave device serial data buses, said serial data translator functioning to translate between said master device protocol and said slave device protocol when transmitting serial data between said master device and said set of slave devices.

27. The system as described in claim 26 wherein serial data being transmitted from said master device includes a clock signal and wherein said serial data translator is clocked with said clock signal.

28. The system as described in claim 27 wherein said serial data translator internally utilizes serial data control signals that are formatted into a sub-protocol other than said associated master device protocol and said serial data control signals include information indicating transmission states and conditions and the number of data bits in serial data being transmitted between said master device and said set of slave devices.

29. The apparatus as described in claim 28 wherein said associated master device protocol is the I²C protocol and wherein one of said associated slave device protocol is SPI protocol and another of said associated slave device protocol is MicroWIRE protocol.

30. The apparatus as described in claim 29 wherein said serial data translator includes a means for generating a gate enable signal in response to said sub-protocol formatted serial data control signals and said serial data translator also includes a means for gating said serial data being transmitted from said master device onto a selected slave device's associated serial data buses in response to said gate enable signal.

31. The apparatus as described in claim 30 wherein said serial data translator further includes a means for reclocking serial data being transmitted from a given slave device to said master device depending on said given slave device's associated slave device protocol and a means for selecting between said reclocked serial data transmitted from said given slave device and serial data that is directly transmitted from one of said slave devices.

* * * * *

UNITED STATES PATENT AND TRADEMARK OFFICE
CERTIFICATE OF CORRECTION

PATENT NO. : 5,878,234

DATED : March 2, 1999

INVENTOR(S) : Dutkiewicz, et al.

It is certified that errors appear in the above-identified patent and that said Letters Patent is hereby corrected as shown below:

```
At column 6, line 42, replace "illustrates" with --illustrate--.

At column 7, line 9, replace "addresses" with --address--.

At column 9, line 64, replace "I" with --1--.

At column 10, line 34, replace "coupled" with --couple--.

At column 12, line 1, replace "FIGS." with --FIG.--.

At column 15, line 3, replace "save" with --slave--.
At column 15, line 3, "s aid" should read -- said--.
```

Signed and Sealed this

Twenty-fourth Day of August, 1999

Attest:

Q. TODD DICKINSON

*Attesting Officer*  *Acting Commissioner of Patents and Trademarks*